United States Patent
Park et al.

(10) Patent No.: US 9,290,096 B2
(45) Date of Patent: Mar. 22, 2016

(54) APPARATUS AND METHOD FOR INTERLOCKING DISPLAY

(71) Applicant: Hyundai Motor Company, Seoul (KR)

(72) Inventors: Un Kyu Park, Seoul (KR); Sung Bo Yang, Seoul (KR); Myoung Hoon You, Seoul (KR); Dong Uk Kim, Incheon (KR)

(73) Assignee: Hyundai Motor Company, Seoul (KR)

( * ) Notice: Subject to any disclaimer, the term of this patent is extended or adjusted under 35 U.S.C. 154(b) by 231 days.

(21) Appl. No.: 13/910,449

(22) Filed: Jun. 5, 2013

(65) Prior Publication Data

US 2014/0184488 A1 Jul. 3, 2014

(30) Foreign Application Priority Data

Dec. 31, 2012 (KR) .................. 10-2012-0158394

(51) Int. Cl.
*G09G 5/00* (2006.01)
*B60K 35/00* (2006.01)
*G06F 3/14* (2006.01)

(52) U.S. Cl.
CPC ......... *B60K 35/00* (2013.01); *B60K 2350/1096* (2013.01); *B60K 2350/352* (2013.01); *G06F 3/1454* (2013.01); *G09G 2380/10* (2013.01)

(58) Field of Classification Search
CPC combination set(s) only.
See application file for complete search history.

(56) References Cited

U.S. PATENT DOCUMENTS

| | | | |
|---|---|---|---|
| 7,672,504 B2 * | 3/2010 | Childers ................. | 382/154 |
| 8,138,942 B2 * | 3/2012 | Otsuka et al. ........... | 340/815.78 |
| 8,436,893 B2 * | 5/2013 | McNamer et al. ....... | 348/50 |
| 8,508,580 B2 * | 8/2013 | McNamer et al. ....... | 348/43 |
| 8,947,355 B1 * | 2/2015 | Karakotsios ............. | 345/158 |
| 8,964,783 B2 * | 2/2015 | Huang et al. ............ | 370/474 |
| RE45,411 E * | 3/2015 | Fourquin et al. ........ | 33/366.11 |
| 8,970,490 B2 * | 3/2015 | Blomqvist et al. ...... | 345/157 |
| 2004/0239701 A1 | 12/2004 | Crichton | |
| 2008/0272894 A1 | 11/2008 | Lamon et al. | |
| 2009/0322510 A1 * | 12/2009 | Berger et al. ........... | 340/539.1 |
| 2011/0055912 A1 * | 3/2011 | Fusari et al. ............ | 726/8 |

FOREIGN PATENT DOCUMENTS

| | | |
|---|---|---|
| JP | 04-139492 | 5/1992 |
| KR | 10-0163710 B1 | 9/1998 |

(Continued)

OTHER PUBLICATIONS

KR 1020070020634 Choi, Chang Jin Feb. 22, 2007 English Translation.*

*Primary Examiner* — Van Chow
(74) *Attorney, Agent, or Firm* — Mintz Levin Cohen Ferris Glovsky and Popeo, P.C.; Peter F. Corless (57) ABSTRACT

A display interlocking system and method that control a screen output to a display via interlocking between an interlocking apparatus and a display control apparatus. The interlocking apparatus forms an output screen and transmits the output screen to the display control apparatus. In addition, the interlocking apparatus inserts a code corresponding to an event into the output screen when the event is generated to the display control apparatus and transmits the output screen to the display control apparatus. The display control apparatus operates the output screen to be output on the display connected thereto or to be interrupted based on a driver's attention dispersion state when the code is inserted into the output screen.

11 Claims, 6 Drawing Sheets

(56) References Cited

FOREIGN PATENT DOCUMENTS

| KR | 10-0187022 | 12/1998 |
| KR | 10-2006-0009834 A | 2/2006 |
| KR | 10-2006-0070797 | 6/2006 |
| KR | 10-2007-0020634 | 2/2007 |
| KR | 10-1201994 | 11/2012 |

* cited by examiner

APPARATUS AND METHOD FOR INTERLOCKING DISPLAY

CROSS-REFERENCES TO RELATED APPLICATIONS

The priority of Korean patent application No. 10-2012-0158394 filed on Dec. 31, 2012, the disclosure of which is hereby incorporated in its entirety by reference, is claimed.

BACKGROUND OF THE INVENTION

1. Field of the Invention

The present invention relates to an apparatus and method that interlocks a display. More particularly, the present invention relates to technology capable of controlling a screen when an event occurs between an interlocking apparatus and a display control apparatus.

2. Description of the Related Art

Generally, in a display interlocking system, an interlocking apparatus forms an image and transmits the image to a display apparatus and the display apparatus outputs the image to share a screen between the interlocking apparatus and the display apparatus.

However, when the interlocking apparatus transmits the image and an event that the interlocking apparatus may not control, for example, an event in which a control signal channel is disconnected occurs, the interlocking apparatus may not control the image output from the display apparatus. Further, when the image transmitted from the interlocking apparatus is an image which may cause driver distraction, the driver's attention may be disrupted due to an image output through a display apparatus installed in a vehicle and thus vehicle accidents may be caused.

SUMMARY

The present invention provides a display interlocking system and method capable of controlling an output screen in a display control apparatus without control of an interlocking apparatus by inserting codes into the output screen and transmitting the code-inserted output screen in the interlocking apparatus when the interlocking apparatus loses or restores control with respect to the display control apparatus when the output screen is interlocked between the interlocking apparatus and the display control apparatus.

In addition, the present invention provides a display interlocking system and method capable of controlling an output screen based on a driver's attention dispersion state in a display control apparatus when an interlocking apparatus loses control with respect to the display control apparatus when an output screen is interlocked between the interlocking apparatus and the display control apparatus installed in a vehicle.

According to an aspect of the present invention, a display interlocking system may be configured to control a screen output to a display via interlocking between an interlocking apparatus and a display control apparatus. The interlocking apparatus may include: an image processor configured to form an output screen that is transmitted to the display control apparatus; a code inserting unit configured to insert a code corresponding to an event into the output screen when the event is generated to the display control apparatus; and a transmitter configured to transmit the output screen to the display control apparatus. The display control apparatus may include a process and a storage device.

The code inserting unit may be configured to insert a screen output locking code to control the output screen not to be displayed according to a driver's attention dispersion state into the output screen when the interlocking apparatus loses control with respect to the display control apparatus.

The code inserting unit may insert a screen output unlocking code into the output screen when a control state between the interlocking apparatus and the display control apparatus is restored to a normal state (e.g., wherein the interlocking apparatus does not lose control with respect to the display control apparatus). The code inserting unit may insert one code corresponding to each generated event into the output screen.

According to another aspect of the present invention, a display control apparatus in a display interlocking system may include: an image analyser configured to analyse the output screen received from an interlocking apparatus and extract a code inserted in the output screen; a code interpreter configured to interpret the code when the code is inserted into the output screen; a vehicle state checking unit configured to determine a vehicle state based on information received from a vehicle state sensor connected thereto when the code is inserted into the output screen; and an output controller configured to operate the output screen to be output on the display connected thereto or to be interrupted based the inserted code according to the user's attention dispersion state.

The output controller may be configured to set a screen output lock to prevent the output screen to be output through the display when the vehicle state checking unit determines that the driver is in an attention dispersion state when the screen output locking code is inserted into the output screen. In addition, the output controller may be configured to operate an alternative screen to be output through the display when the screen output lock is set. The output controller may be configured to release the screen output lock setting when a screen output unlocking code corresponding to the screen output locking code is inserted into the output screen. The output controller may further be configured to operate the output screen to be output through the display when the vehicle state checking unit determines that the driver is not in the attention dispersion state when the screen output locking code is inserted in the output screen.

According to another aspect of the present invention, a display interlocking method of an interlocking apparatus may include: forming an output screen that is transmitted to a display control apparatus; inserting a code corresponding to an event into the output screen when the event is generated to the display control apparatus; and transmitting the output screen to the display control apparatus.

The inserting may include inserting a screen output locking code to prevent the output screen from being displayed based on a driver's attention dispersion state into the output screen when the interlocking apparatus loses control with respect to the display control apparatus. The inserting may further include inserting a screen output unlocking code corresponding to the screen output locking code into the output screen when a control state between the interlocking apparatus and the display control apparatus is restored to a normal state (e.g., wherein the interlocking apparatus does not lose control with respect to the display control apparatus).

According to another aspect of the present invention, a display interlocking method of a display control apparatus may include: analysing an output screen received from an interlocking apparatus and extracting a code inserted into the output screen; interpreting the code when the code is inserted into the output screen; checking a vehicle state based on information received from a vehicle state sensor connected thereto when the code is inserted into the output screen and determining a driver's attention dispersion state; and operating the output screen to be output on the display connected thereto or to be interrupted based on the inserted code according to the driver's attention dispersion state.

The operating of the output screen may include setting a screen output lock to prevent the output screen to be output through the display when the driver is determined to be in an attention dispersion state when a screen output locking code is inserted into the output screen. In addition, the operating of the output screen may further include operating an alternative screen to be output through the display when the screen output locking is set. The operating of the output screen may further include releasing the screen output lock setting when the screen output unlocking code corresponding to the screen output locking code is inserted into the output screen. Furthermore, the operating of the output screen may include operating the output screen to be output through the display when the driver is determined to not be in the attention dispersion state when the screen output locking code is inserted into the output screen.

According to the exemplary embodiments of the present invention, when an output screen between an interlocking apparatus and a display control apparatus is interlocked and when the interlocking apparatus loses control with respect to the display control apparatus or restores to a normal state, the display control apparatus may be configured to operate the output screen by inserting a code into the output screen and transmit the code-inserted output screen in the interlocking apparatus without the control of the interlocking apparatus.

Further, when an output screen between an interlocking apparatus and a display control apparatus is interlocked and when the interlocking apparatus loses control with respect to the display control apparatus, the display control apparatus may be configured to operate the output screen based on the driver's attention dispersion state, thereby improving driving stability even when the interlocking apparatus may not control the display control apparatus.

The systems and methods of the present invention have other features and advantages which will be apparent from or are set forth in more detail in the accompanying drawings, which are incorporated herein, and the following Detailed Description of the Invention, which together serve to explain exemplary principles of the present invention.

DETAILED DESCRIPTION

Reference will now be made in detail to various embodiments of the present invention(s), examples of which are illustrated in the accompanying drawings and described below. Like reference numerals in the drawings denote like elements. When it is determined that detailed description of a configuration or a function in the related disclosure interrupts understandings of embodiments in description of the embodiments of the invention, the detailed description will be omitted.

Although exemplary embodiment is described as using a plurality of units to perform the exemplary process, it is understood that the exemplary processes may also be performed by one or plurality of modules. Additionally, it is understood that the term controller refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It should be understood that in a detail description below, as suffixes for configuration elements, 'module' and 'unit' are assigned or used together, for clarity, but there is no distinctive meaning or function between them per se.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Figure 1:
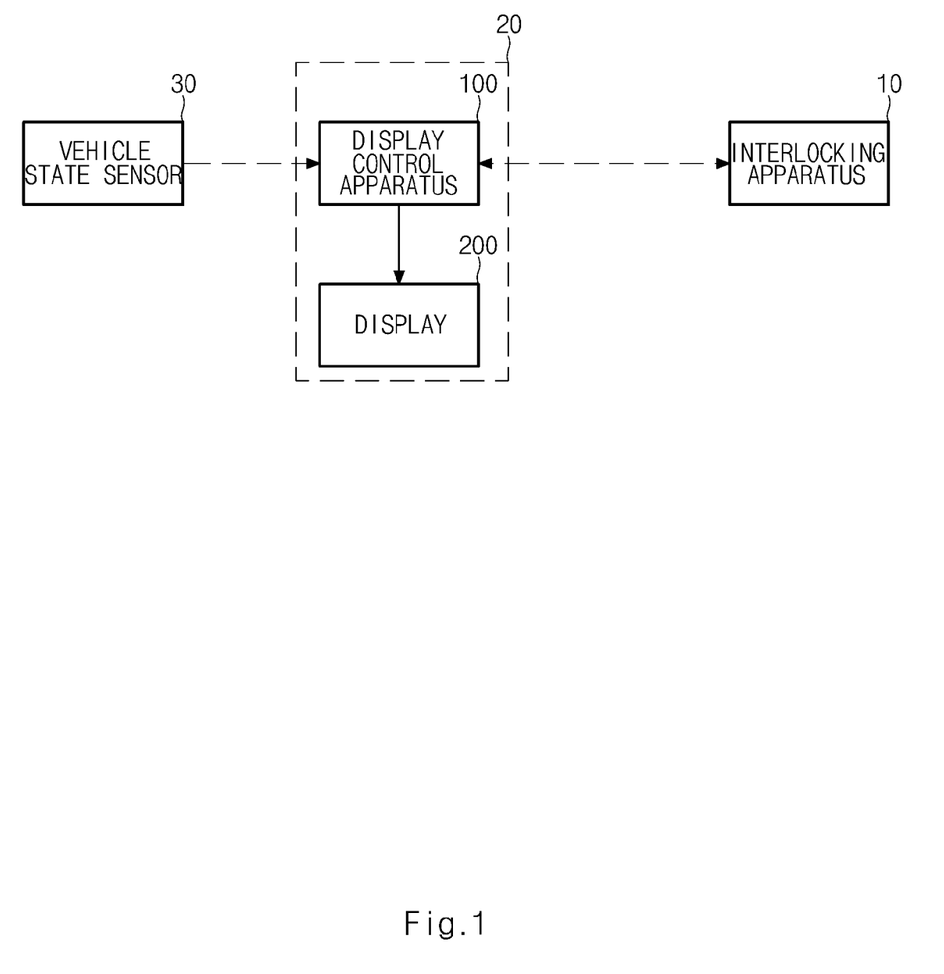
FIG. 1 is an exemplary block diagram illustrating a configuration of a display interlocking system according to an exemplary embodiment of the present invention.

FIG. 1 is an exemplary block diagram illustrating a configuration of a display interlocking system according to an exemplary embodiment of the present invention. Referring to FIG. 1, a display interlocking system may include an interlocking apparatus 10 and a display system 20.

The interlocking apparatus 10 may be configured to provide a screen output through the display system 20. The interlocking apparatus 10 may be interlocked with the display system 20 in a real time and the output screen generated in the interlocking apparatus 10 may be output through the display system 20. In addition, the interlocking apparatus 10 may have control of the output screen with respect to the display system 20 and the display system 20 may be configured to output the output screen under control of the interlocking apparatus 10. When the interlocking apparatus 10 loses control of the output screen with respect to the display system 20, the interlocking apparatus may be configured to insert a code for a control command into the output screen and provide the output screen to the display system 20. Detailed description thereof will be made in detail with reference to FIG. 2.

The display system 20 may include a display 200 and a display control apparatus 100 configured to execute an output operation of the display 200 according to control of the interlocking apparatus 10. In particular, the display system 20 may be installed within a vehicle and provide the output screen to a driver.

The display control apparatus 100 may be configured to operate the output screen provided from the interlocking apparatus 10 to be output through a display 200. When a separate code is inserted into the output screen, the display control apparatus 100 may be configured to interpret the inserted code and operate the output screen to be output through the display 200 according to an interpretation result. In particular, the display control apparatus 100 may be connected to a vehicle state sensor 30. The display control apparatus 100 may be configured to determine a vehicle state based on information received from the vehicle state sensor 30, and determine a driver's attention dispersion state. When the separate code is inserted into the output screen, the display control apparatus 100 may be configured to operate the output screen through the display 200 based on the inserted code. Furthermore, the display control apparatus may be configured to reflect the driver's attention dispersion state and operate the output screen based on the reflecting result. Detailed description thereof will be made in detail with reference to FIG. 3.

Figure 2:
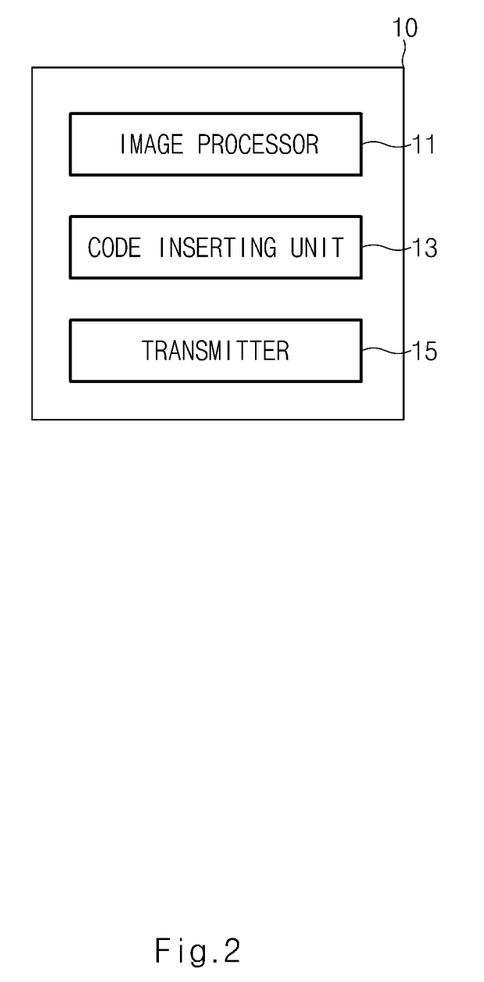
FIG. 2 is an exemplary block diagram illustrating a detailed configuration of an interlocking apparatus of FIG. 1 according to an exemplary embodiment of the present invention.

FIG. 2 is an exemplary block diagram illustrating a detailed configuration of an interlocking apparatus of FIG. 1. Referring to FIG. 1, the interlocking apparatus 10 may include an image processor 11, a code inserting unit 13 and a transmitter 15.

First, the image processor 11 may be configured to form an output screen that is transmitted to a display control apparatus connected to the interlocking apparatus 10. In particular, the output screen formed by the image processor 11 is a screen output through a display system, but the output screen is not limited to a screen for any one field. As screen forming technology of the image processor 11, screen forming technology applied to an interlocking system, which has been generally used, is applied. Therefore, detailed description of the output screen forming technology will be omitted.

The transmitter 15 may be configured to transmit the output screen formed by the image processor 11 to the display control apparatus. Therefore, the display system may be configured to output the output screen transmitted by the transmitter 15 to the display. When a specific event is generated between the interlocking apparatus 10 and the display system, the code inserting unit 13 may be configured to insert a code corresponding to the generated event into the output screen. In particular, the code inserting unit 13 may be configured to insert one code corresponding to each generated event into the output screen.

As one example, the specific event may correspond the interlocking apparatus 10 losing control with respect to the display system or control of the interlocking apparatus 10 with respect to the display control apparatus is restored to a normal state (e.g., wherein the interlocking apparatus does not lose control with respect to the display control apparatus). In other words, the code inserting unit 13 may be configured to insert a screen output locking code to prevent the output screen from being output based on the driver's attention dispersion state into the output screen when the interlocking apparatus 10 loses control with respect to the display system. In particular, the code inserting unit 13 may be configured to insert the screen output locking code only into any one scene or a frame of the output screen. When the screen output locking code is inserted only once, the corresponding code may also be applied to the output screens subsequently transmitted. Therefore, the screen output locking code may be initially inserted once.

Further, the code inserting unit 13 may be configured to insert a screen output unlocking code corresponding to the screen output locking code into the output screen when control of the interlocking apparatus 10 with respect to the display control apparatus is restored after the output screen into which the screen output locking code is inserted is transmitted to the display control apparatus. In addition, the code inserting unit 13 may be configured to insert the screen output unlocking code only into any one scene or a frame of the output screen.

Moreover, while the transmitter 15 transmits the output screen formed by the image processor 11 to the display system when a specific event is not generated, the transmitter 15 may be configured to transmit the output screen into which the code is inserted by the code inserting unit 13 to the display system when the specific event is generated.

Figure 3:
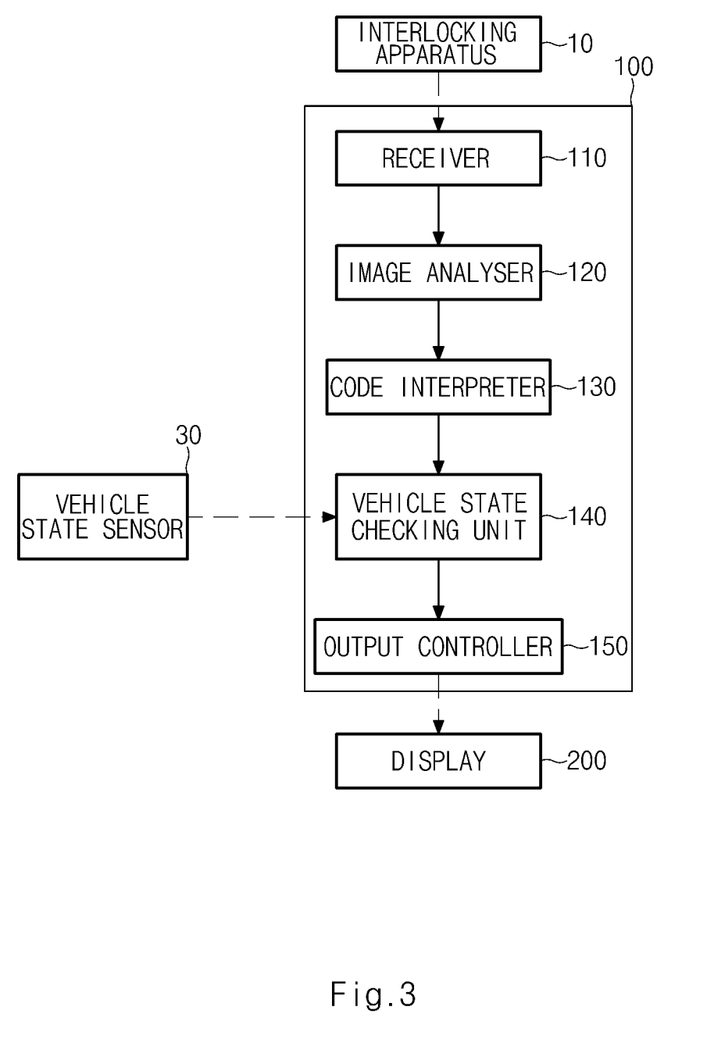
FIG. 3 is an exemplary block diagram illustrating a detailed configuration of a display control apparatus of FIG. 1 according to an exemplary embodiment of the present invention.

FIG. 3 is an exemplary block diagram illustrating a detailed configuration of the display control apparatus of FIG. 1. Referring to FIG. 3, the display control apparatus 100 may include a receiver 110, an image analyser 120, a code interpreter 130, a vehicle state checking unit 140, and an output controller 150.

The receiver 110 may be connected to the interlocking apparatus 10 and may be configured to receive the output screen and a control signal corresponding to the output screen provided from the interlocking apparatus 10.

The image analyser 120 may be configured to analyze the output screen received from the interlocking apparatus 10 and transfer an analysis result to the output controller 150. In particular, the image analyser 120 may be configured to analyze whether the output screen is a scene causing the driver's attention dispersion. Further, the image analyser 120 may determine whether a code is inserted into the output screen and extract the code inserted into the output screen when the code is inserted into the output screen. In addition, the image analyser 120 may be configured to transfer the extracted code to the code interpreter 130 and output the output screen to the output controller 150. The image analyser 120 may be configured to directly transfer the output screen to the output controller 150 when the code is not inserted into the output screen.

The code interpreter 130 may be configured to interpret the code inserted into the output screen. As one example, the code interpreter 130 may be configure to interpret a screen output locking code and detect a command corresponding to the screen output locking code when the screen output locking code is inserted into the output screen. Further, the code interpreter 130 may be configured to interpret a screen output unlocking code and detect a command corresponding to the screen output unlocking code when the screen output unlocking code is inserted into the output screen.

The vehicle state checking unit 140 may be configured to determine a vehicle state based on information received from the vehicle state sensor 30 connected thereto and determine the driver's attention dispersion state when the screen output locking code is inserted into the output screen. The vehicle state checking unit 140 may be configured to transfer a determination result of the driver's attention dispersion state to the output controller 150.

The output controller 150 may be configured to provide an input output screen to the display 200 when the output screen is input from the image analyser 120 and operate the output screen to be output through the display 200. The output controller 150 may operate screen output through the display 200 based on the code inserted into the output screen according to the driver's attention dispersion state determined from the vehicle state checking unit 140 when the code is inserted into the output screen.

As one example, the output may be configured to set a screen output lock to prevent the output screen to be output through the display 200 when the vehicle state checking unit 140 determines that the driver is in an attention dispersion state when the screen output locking code is inserted into the output screen. Further, the output controller 150 may be configured to operate an alternative screen to be output through the display 200 other than the output screen when the screen output locking is set.

The output controller 150 may be configured to determine that the output screen is not a screen which causes the driver's attention dispersion and operate the output screen provided from the interlocking apparatus 10 to be output through the display 200 when the vehicle state checking unit 140 determines that the driver is not in the attention dispersion state when the screen output locking code is inserted into the output screen.

As another example, the output controller 150 may be configured to release the screen output lock setting set by the screen output locking code when the screen output unlocking code is inserted into the output screen. The output controller 150 may be configured to operate output screens to be subsequently received to be output through the display 200 when the screen output locking setting is released.

Figure 4A:
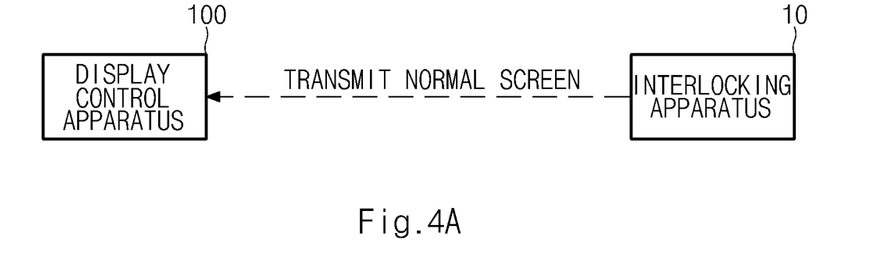
FIGS. 4A-4C are exemplary views illustrating an operation flow of a display interlocking system according to an exemplary embodiment of the present invention.

FIG. 4 is an exemplary view illustrating an operation of display interlocking system according to an exemplary embodiment of the present invention. Referring to FIG. 4, the interlocking apparatus 10 may be configured to form an output screen in a normal mode and transmit the output screen to the display control apparatus 100 as shown in FIG. 4(*a*).

Figure 4B:
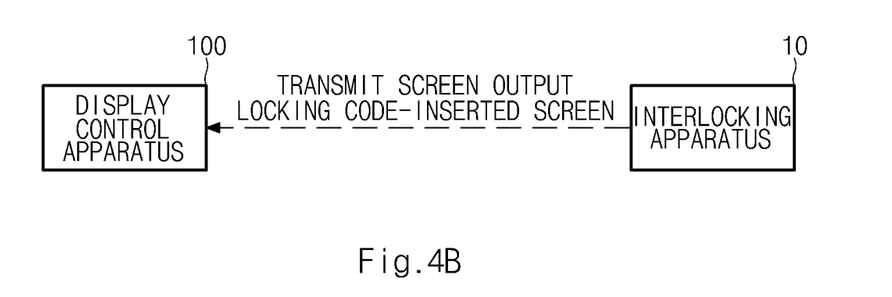

When a specific event occurs between the interlocking apparatus 10 and the display control apparatus 100, for example, when the interlocking apparatus loses control with respect to the display control apparatus 100, the interlocking apparatus 10 may be configured to insert the screen output locking code into the output screen that is transmitted to the display control apparatus 100 as shown in FIG. 4(*b*). In addition, the screen output locking code inserted in the output screen may be a code including a command for controlling the output screen not to be displayed according to the driver's attention dispersion state and may be inserted into the output screen in various types of codes. As one example, the screen output locking code may be inserted into the output screen in a type of a bar code, a quick response (QR) code, or the like.

Figure 4C:
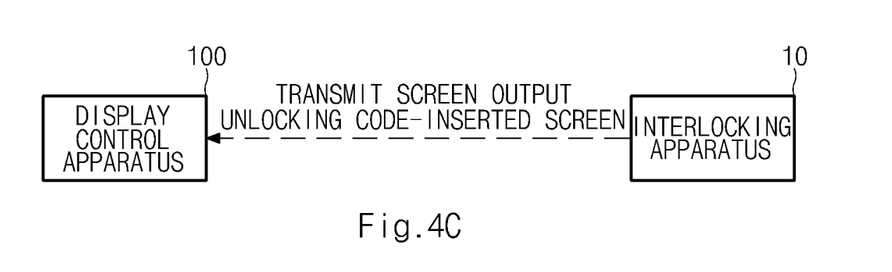

Further, when an event in which the interlocking apparatus 10 restores control with respect to the display control apparatus 100 occurs, the interlocking apparatus 10 may be configured to insert the screen output unlocking code into the output screen that is transmitted to the display control apparatus 100 as shown in FIG. 4(*c*). In addition, the screen output unlocking code inserted into the output screen may be a code including a command for releasing the screen output locking corresponding to the screen output locking code inserted into the output screen illustrated in FIG. 4(*b*) and may be inserted into the output screen in various types of codes. As one example, the screen output unlocking code may be inserted into the output screen in a type of a bar code, a QR code, or the like.

An operation flow of the display interlocking system having the above-described configuration according to an exemplary embodiment of the present invention will be described in more detail below.

Figure 5:
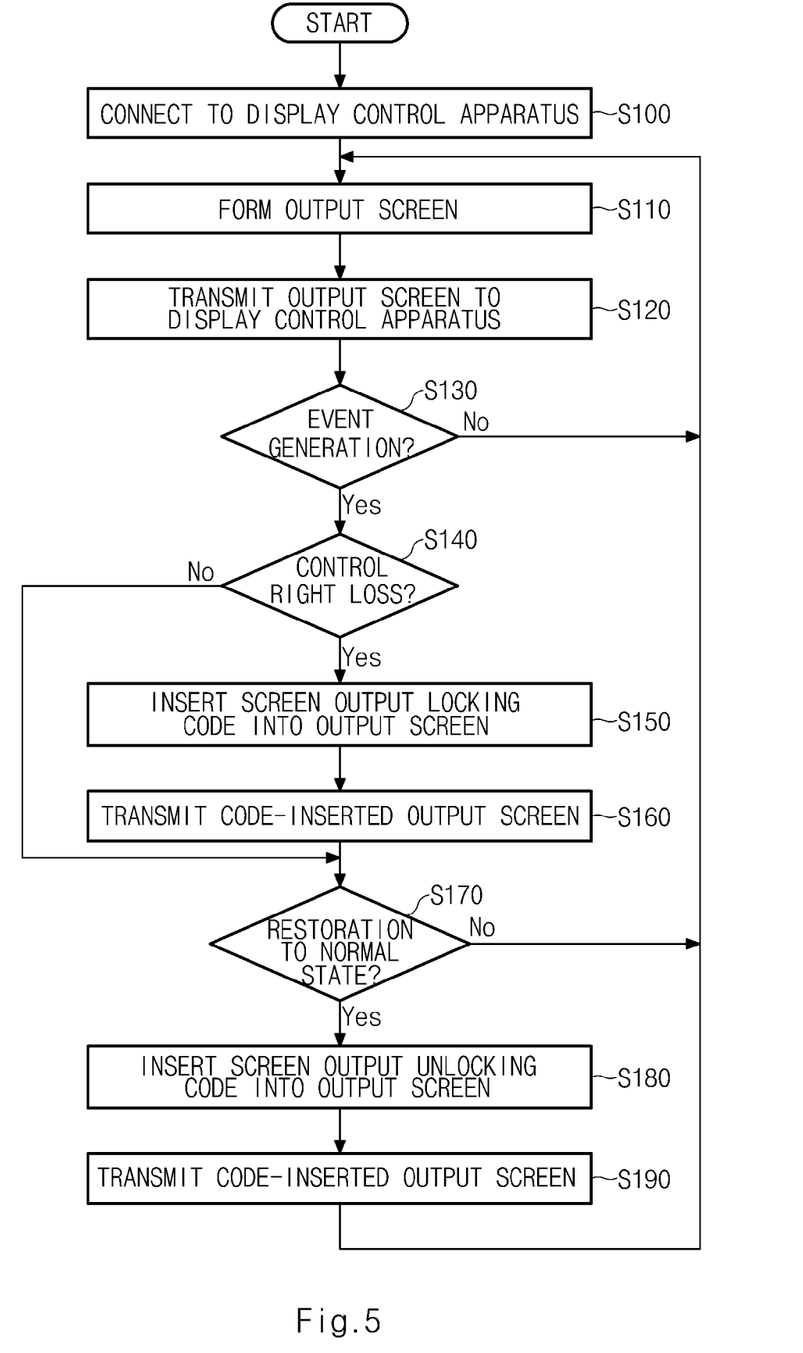
FIGS. 5 and 6 are exemplary flowcharts illustrating operation flows of display interlocking methods according to an exemplary embodiment of the present invention.
Figure 6:
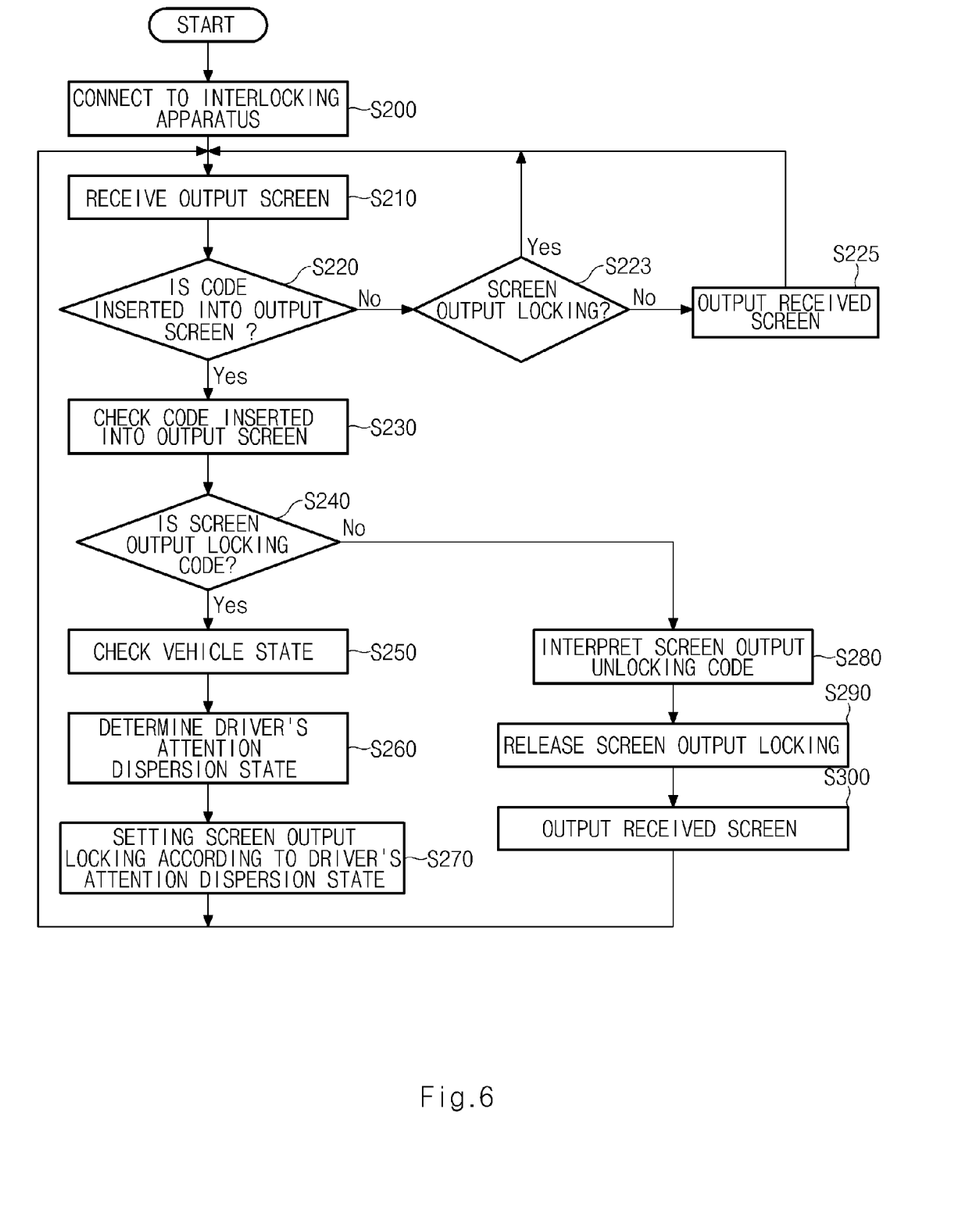

FIGS. 5 and 6 are exemplary flowcharts illustrating operation flows of display interlocking methods of a display interlocking system according to an exemplary embodiment of the present invention.

First, FIG. 5 illustrates an exemplary operation flow of an interlocking apparatus. Referring to FIG. 5, the interlocking apparatus may be connected to a display control apparatus (S100), and screen information generated in the interlocking apparatus may be output to the display control apparatus in a real time. In particular, the interlocking apparatus may be configured to form an output screen that is transmitted to the display control apparatus (S110) and transmit the output screen formed in step S110 to the display control apparatus (S120).

When an event occurs between the interlocking apparatus and the display control apparatus (S130), specifically, when the interlocking apparatus loses control with respect to the display control apparatus (S140), the interlocking apparatus may be configured to insert the screen output locking code that controls the output screen not to be displayed according to the driver's attention dispersion state into the output screen (S150). Subsequently, the interlocking apparatus may be configured to transmit the output screen into the screen output locking code is inserted in step S150 to the display control apparatus (S160). In addition, the output screen into which the screen output locking code is inserted may be transmitted once and subsequently output screens into which the screen output locking code is not inserted may be transmitted.

When control of the interlocking apparatus with respect to the display control apparatus is restored to a normal state after the output screen, into which the screen output locking code is inserted, is transmitted to the display control apparatus in step S160 (S170), the interlocking apparatus may be configured to insert a screen output unlocking code corresponding to the screen output locking code into the output screen (S180). Subsequently, the interlocking apparatus may be configured to transmit the output screen into which the screen output unlocking code is inserted in step S180 to the display control apparatus (S190). The interlocking apparatus may be configured to transmit the output screen into which the screen output unlocking code is inserted once and subsequently transmit output screens into which the screen output unlocking code is not inserted.

Therefore, the present invention inserts a code that controls the output screen and transmits the code-inserted into output screen to the display system when the interlocking apparatus loses control with respect to the display control apparatus, thereby controlling output of the output screen without the control command.

FIG. 6 illustrates an exemplary operation flow of a display control apparatus. Referring to FIG. 6, a display control apparatus may be connected to an interlocking apparatus (S200), and may be configured to receive an output screen generated from the interlocking apparatus (S210), and output the received output screen through a display connected thereto in a real time (S225). When the output screen is received from the interlocking apparatus and when screen output locking has been set with respect to the display control apparatus (S223), the step S225 may be omitted.

The display control apparatus may be configured to analyze the output screen received from the interlocking apparatus and when a code is inserted into the output screen (S220), the display control apparatus may be configured to determine the code inserted into the output screen. When the code inserted into the output screen is the screen output locking code (S240), the display control apparatus may be configured to determine a vehicle state based information received from a vehicle state sensor related thereto (S250), and determine the driver's attention dispersion state (S260).

In particular, the display control apparatus may be configured to perform an operation corresponding to the screen output locking code according to a determination result in step S260. As one example, the display control apparatus may be configured to set a screen output lock not to output the output screen through a display when a determination result in step S260 determines that the driver is in an attention dispersion state (S270). In addition, the display control apparatus may be configured to operate an alternative screen to be output through the display other than the output screen. As another example, the display control apparatus may be configured to operate the output screen to be output through the display when the determination result in step S260 determines that the driver's is not in the attention dispersion state when the screen output locking code is inserted in the output screen.

When the code inserted into the output screen is the screen output unlocking code, the display control apparatus may be configured to interpret the screen output unlocking code (S280), release the screen output locking setting based on an interpretation result in step S280 (S290) and operate the received output screen and output screens to be subsequently received to be output through the display (S300).

The foregoing descriptions of exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A display interlocking system, the system comprising:
    an interlocking apparatus; and
    a display control apparatus, wherein the display interlocking system is configured to operate a screen output to a display via interlocking between the interlocking apparatus and the display control apparatus,
    wherein the interlocking apparatus includes:
        an image processor configured to form an output screen that is transmitted to the display control apparatus;
        a code inserting unit configured to insert a code corresponding to an event into the output screen when the event is generated to the display control apparatus, wherein one code corresponding to each generated event is inserted into the output screen, and further configured to insert a screen output locking code that controls the output screen not to be displayed based on a driver's attention dispersion state into the output screen when a control state between the interlocking apparatus and the display control apparatus is not a normal state and to insert a screen output unlocking code corresponding to the screen output locking code into the output screen when the control state between the interlocking apparatus and the display control apparatus is restored to the normal state; and
    a transmitter configured to transmit the output screen to the display control apparatus.

2. A display interlocking system, the system comprising:
    an interlocking apparatus; and
    a display control apparatus, wherein the display interlocking system is configured to operate a screen output to a display via interlocking between the interlocking apparatus and the display control apparatus,
    wherein the display control apparatus includes:
        an image analyser configured to analyze the output screen received from the interlocking apparatus and extract a code inserted in the output screen;
        a code interpreter configured to interpret the code when the code is inserted into the output screen;
        a vehicle state checking unit configured to determine a vehicle state based on information received from a vehicle state sensor connected thereto when the code is inserted into the output screen and to determine a driver's attention dispersion state based on the information received from the vehicle state sensor and a standard state of driver's attention dispersion; and
        an output controller configured to operate the output screen to be output on the display connected thereto or to be interrupted based the inserted code based on the driver's attention dispersion state and operate an alternative screen to be output through the display when the output screen is prevented from being output through the display.

3. The system of claim 2, wherein the output controller is further configured to:
    set a screen output lock to prevent the output screen from being output through the display when the vehicle state checking unit determines that the driver is in an attention dispersion state when the screen output locking code is inserted into the output screen.

4. The system of claim 3, wherein the output controller is further configured to:
    release the screen output lock setting when a screen output unlocking code corresponding to the screen output locking code is inserted into the output screen.

5. The system of claim 2, wherein the output controller is further configured to:
    operate the output screen to be output through the display when the vehicle state checking unit determines that the driver is not in the attention dispersion state when the screen output locking code is inserted in the output screen.

6. A display interlocking method of an interlocking apparatus that controls a screen output to a display via interlocking between the interlocking apparatus and a display control apparatus, the method comprising:
    forming, by an image processor, an output screen that is transmitted to the display control apparatus;
    inserting, by a code inserting unit, a code corresponding an event into the output screen when the event is generated to the display control apparatus, wherein one code corresponding to each generated event is inserted into the output screen;
    inserting, by the code inserting unit, a screen output locking code that controls the output screen not to be display based on a driver's attention dispersion state into the output screen when a control state between the interlocking apparatus and the display control apparatus is not a normal state;

inserting, by the code inserting unit, a screen output unlocking code corresponding to the screen output locking code into the output screen when the control state between the interlocking apparatus and the display control apparatus is restore to die normal state; and transmitting, by a transmitter, the output screen to the display control apparatus.

7. A display interlocking method of a display control apparatus that controls a screen output to a display via interlocking between the interlocking apparatus and a display control apparatus, the method comprising:

analyzing, by an image analyzer, an output screen received from the interlocking apparatus;

extracting, by the image analyzer, a code inserted into the output screen;

interpreting, by a code interpreter, the code when the code is inserted into the output screen;

determining, by a vehicle state checking unit, a vehicle state based on information received from a vehicle state sensor connected thereto when the code is inserted into the output screen;

determining, by the vehicle state checking unit, a driver's attention dispersion state based on the information received from the vehicle state sensor and a standard state of driver's attention dispersion;

operating, by an output controller, the output screen to be output on the display connected thereto or to be interrupted based on the inserted code based on the driver's attention dispersion state; and operating, by the output controller, an alternative screen to be output through the display when the output screen is prevented from being output through the display.

8. The method of claim 7, wherein the operating further includes:

setting, by the output controller, a screen output lock to prevent the output screen to not be output through the display when the driver is determined to be in an attention dispersion state when a screen output locking code is inserted into the output screen.

9. The method of claim 8, wherein the operating further includes:

releasing, by the output controller, the screen output lock setting when the screen output unlocking code corresponding to the screen output locking code is inserted into the output screen.

10. The method of claim 7, wherein the operating further includes:

operating, by the output controller, the output screen to be output through the display when the driver is determined to not be in the attention dispersion state when the screen output locking code is inserted into the output screen.

11. A non-transitory computer readable medium containing program instructions executed by a processor or controller, the computer readable medium comprising:

program instructions that analyze an output screen received from the interlocking apparatus;

program instructions that extract a code inserted into the output screen;

program instructions that interpret the code when the code is inserted into the output screen;

program instructions that determine a vehicle state based on information received from a vehicle state sensor connected thereto when the code is inserted into the output screen;

program instructions that determine a driver's attention dispersion state based on the information received from the vehicle state sensor and a standard state of driver's attention dispersion;

program instructions that operate the output screen to be output on the display connected thereto or to be interrupted based on the inserted code based on the driver's attention dispersion state; and program instructions that operate an alternative screen to be output through the display when the output screen is prevented from being output through the display.

* * * * *